July 17, 1956 — G. A. LYON — 2,754,943
AIR CIRCULATING WHEEL STRUCTURE
Filed Feb. 15, 1954 — 3 Sheets-Sheet 1
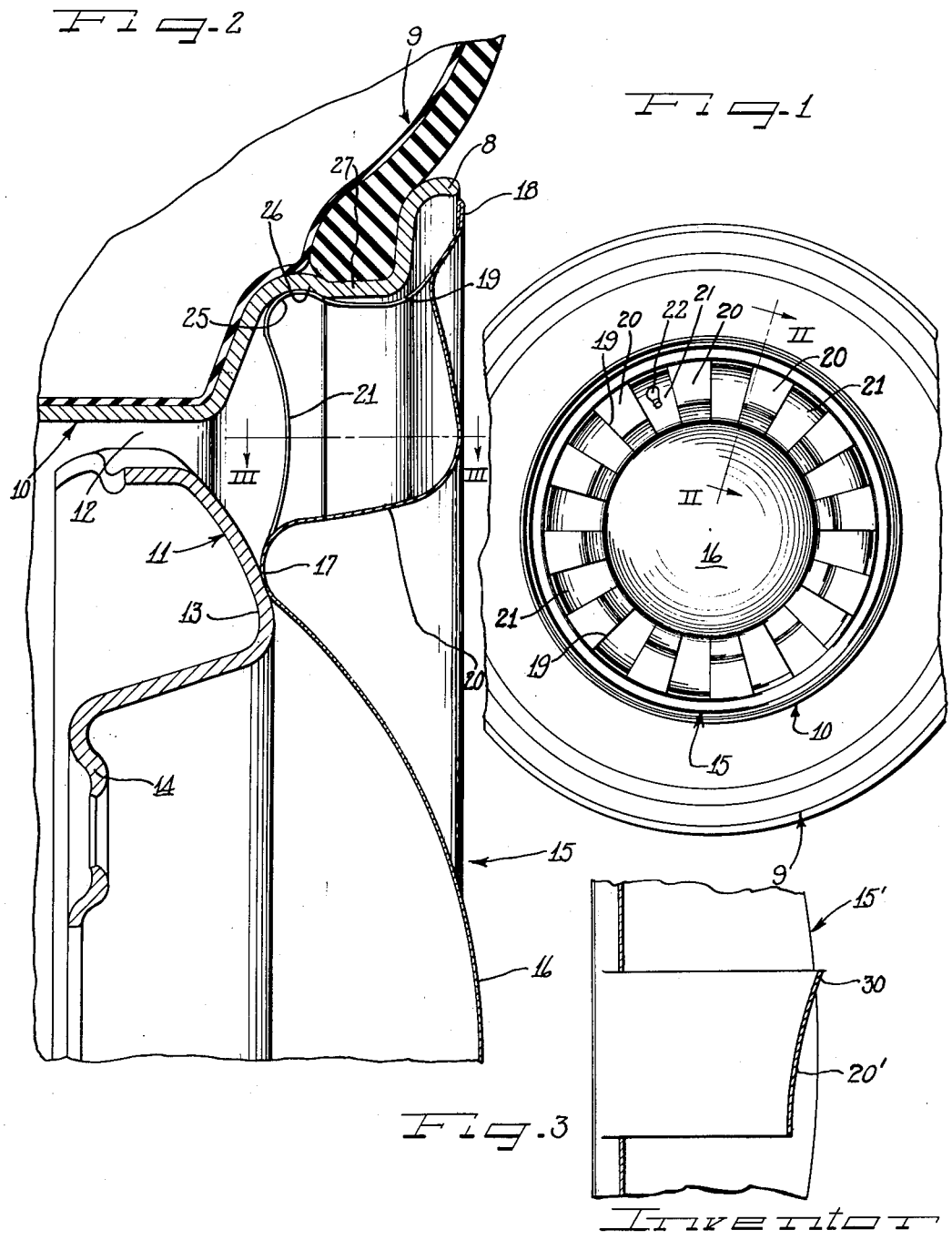
Inventor
George Albert Lyon
by Hill, Sherman, Meroni, Gross & Simpson
Attys July 17, 1956  G. A. LYON  2,754,943
AIR CIRCULATING WHEEL STRUCTURE
Filed Feb. 15, 1954  3 Sheets-Sheet 2
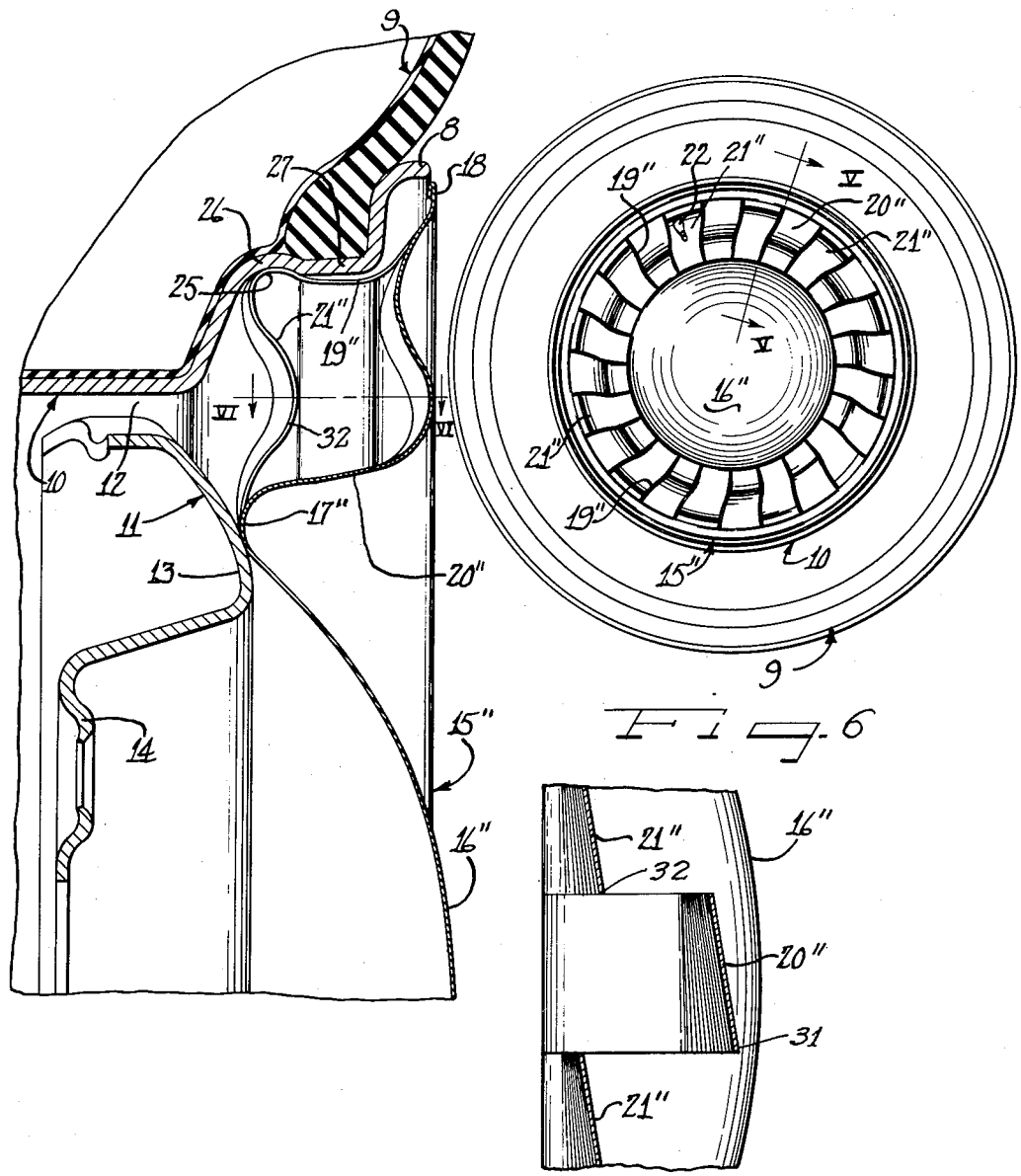
Inventor
George Albert Lyon
by Hill, Sherman, Meroni, George & Simpson
Attys

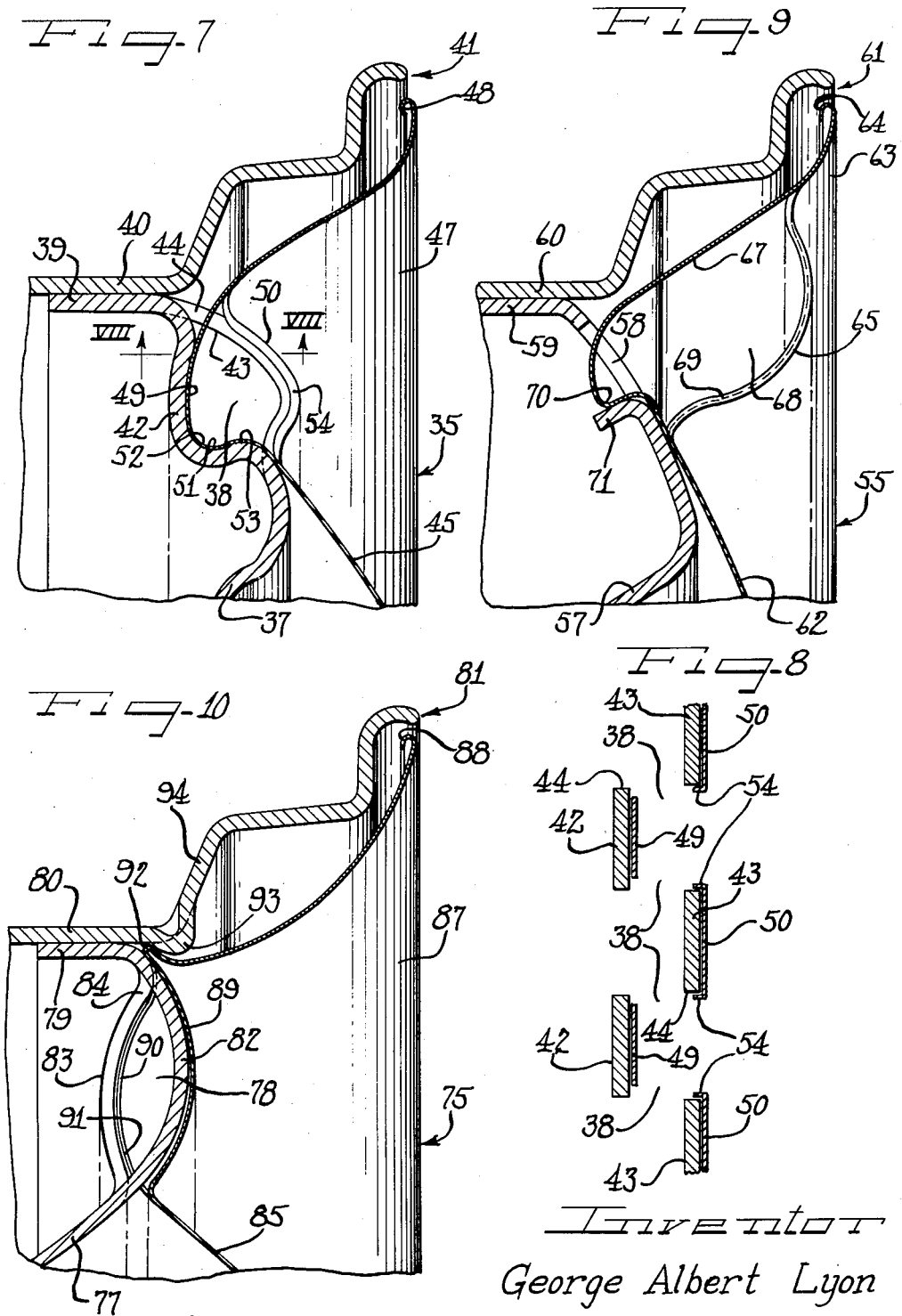

United States Patent Office 2,754,943
Patented July 17, 1956

2,754,943

AIR CIRCULATING WHEEL STRUCTURE

George Albert Lyon, Detroit, Mich.

Application February 15, 1954, Serial No. 410,579

15 Claims. (Cl. 188—264)

This invention relates to air circulating wheel structures and more particularly to automobile wheel structures with covers of an ornamental construction such that the cover has a spoke-like appearance as well as air circulation efficiency.

The present subject-matter has been carved in part from my co-pending patent application, Serial No. 298,124, filed July 10, 1952, now abandoned.

An object of this invention is to provide in a wheel structure a highly ornamental spoke simulating wheel cover wherein the spokes serve as air scoops and which lends itself to manufacture on a large production scale.

Another object of this invention is to provide a wheel cover wherein air scoops are located in a plurality of spaced planes and wherein the air scoops are skewed and to direct air from one of said planes through the other.

A further object of the invention is to provide a wheel cover having self retaining means engageable with a portion of a wheel under resilient pressure applied by radial or helical vanes.

Yet another object of the invention is to provide an air circulation type of cover having large aggregate air circulation areas therethrough while nevertheless the openings through the cover are substantially concealed from the outer side of the cover.

Other objects, features and advantages of this invention will more fully appear from the following detailed description taken in connection with the accompanying drawings, in which:

Figure 1 is a fragmentary side elevation of a wheel with my novel cover applied thereto;

Figure 2 is a fragmentary enlarged radial sectional view taken on substantially the line II—II of Figure 1;

Figure 3 is a fragmentary cross-sectional view taken substantially on the line III—III of Figure 2 but showing a modification of the outer spoke elements to assist in scooping air into and through the cover;

Figure 4 is a side elevational view of a vehicle wheel showing a modification of the cover;

Figure 5 is an enlarged fragmentary radial sectional view taken substantially on the line V—V of Figure 4;

Figure 6 is a fragmentary sectional detail view taken substantially on the line VI—VI of Figure 5;

Figure 7 is a fragmentary radial sectional view of a further modification;

Figure 8 is a more or less schematic radial sectional view taken substantially on the line VIII—VIII of Figure 7;

Figure 9 is a fragmentary radial sectional view through a wheel structure showing still another modification; and Figure 10 is a fragmentary radial sectional view through a wheel structure showing still another modification.

My novel wheel cover is especially adapted for use in connection with commercial automobile wheels such as are now available on the market. Accordingly, I have illustrated such a wheel in the accompanying drawings wherein a conventional pneumatic tire and tube assembly is designated by the reference character 9 and is carried in the usual way upon a multi-flanged tire rim 10. The tire rim 10 is supported upon a bulged wheel body part 11 which is secured at spaced intervals to the base of the tire rim 10, as is well known in the art, with insets at suitable intervals such as three to five leaving transverse wheel openings 12 through which air can circulate in the rotation of the wheel. The body part 11 includes an intermediate annular nose bulge portion 13 and is dished at its center to provide a bolt-on flange 14 by means of which the wheel may be detachably secured in the usual way by cap screws or bolts (not shown) to a part on the axle of a wheel.

Herein the wheel cover is designated generally by the reference character 15 and is preferably made from one piece of sheet metal such, for example, as stainless steel or the like. It lends itself to economical production by means of suitable press equipment.

The cover includes a central curved crown portion 16, for disposition over the center of the wheel, and converges into an annular dished or depressed portion 17 comprising a flange or shoulder providing a reinforcing and rigidifying rib adapted to bottom on the nose portion 13 of the wheel when the cover is on the wheel.

The outer periphery of the cover 15 is formed into a turned reinforcing pry-off edge flange 18 so disposed as to be spaced from the outer terminal flange 8 of the tire rim part 10.

Between the outer peripheral flange 18 and the flange 17, which constitute reinforcements, I provide the cover with a plurality of pairs of radial slits 19 which define alternate outer spoke portions 20 and inner spoke portions 21. In addition to alternating with each other, the spoke portions 20 and 21 are disposed in different planes, that is, they are directed generally in opposite axial directions; the portions 20 being bulged or humped generally axially outwardly and the portions 21 being bulged generally axially inwardly.

In actual practice the slits 19 may be suitably cut in the annular portion of the cover between its peripheral margin 18 and the rib flange 17, and then the spoke portions 21 may be bulged or pressed inwardly so that such portions are curved generally in an opposite direction from the curve of the spoke portions 20. On the other hand, the outer spoke portions 20 may be pressed out of the plane of the spokes 21.

At least one of the spoke portions 21 may be provided with an aperture for accommodating a valve stem 22 projecting in the usual way from the tire and tube assembly (Fig. 1).

According to the present invention the spoke elements or portions 21 are utilized for retaining the cover on the wheel. To this end, the spoke elements 21 are formed with a generally radially extending leg portion and a generally axially extending leg portion at the adjacent joined extremities of which is provided a curved generally radially outwardly bulging retaining terminal shoulder portion 25 adapted to engage resiliently in retaining relation in an annular generally radially inwardly opening groove 26 provided at the axially inner portion of an intermediate generally axially outwardly and radially outwardly sloping flange 27 of the tire rim 10. The terminal retaining shoulder portions 25 are arranged normally in a common circle of a diameter slightly greater than that of the bottom or largest diameter surface of the groove 26. Thereby, when the retaining shoulder portions 25 are in engagement within the groove 26 behind the shoulder that defines the axially outer side of the groove, the retaining shoulders 25 are under resiliently gripping tension to hold the cover on the wheel.

In applying the cover to the wheel the same is generally centered with respect to the axis of the wheel and with the valve stem 22 aligned with the opening provided therefor in the appropriate inner spoke element 21, and axially inward pressure is then applied to the cover. This causes the radially outwardly projecting retaining shoulder portions 25 to cam inwardly along the inner face of the intermediate flange 27 and as such intermediate flange slopes inwardly the retaining shoulder portions are flexed radially inwardly as enabled by flexing of the axially extending legs of the spoke elements 21 as well as the radially extending leg portions thereof. Then as the retaining shoulders 25 pass the outer shoulder defining the groove 26, the retaining shoulders 25 snap resiliently into the groove 26 behind the tire rim shoulder. As a result of the resilient flexure of the legs of the spoke elements 21, the resilient reaction thereof acting on the retaining shoulder portions 25 causes the latter to be pressed resiliently into the groove 26. In this, the generally radial thrust effected by the generally radially extending legs of the spoke elements 21 is an important factor in resisting unintentional displacement of the retaining shoulders 25 from the groove 26.

By virtue of the fact that the spoke-like elements 20 and 21 are spaced substantially apart in an axial direction, air circulation opening of large aggregate area is afforded through the spoked annular portion of the wheel cover. It will also be observed from Figure 2 that since the spoke elements 20 and 21 are generally opposite the juncture between the wheel body and the tire rim, and thereby opposite the wheel openings 12, the openings between the spokes are efficiently disposed for promoting air circulation through the wheel. In the forward movement of the wheel in service, air can enter through the openings between the spokes in the cover at the forward side of the wheel and pass on through the wheel openings 12 to the inner side of the wheel and thus into cooling relation to a brake drum customarily associated with the axle part to which the wheel is attached. At the same time, air can escape through the wheel openings 12 at the rear side of the wheel in service and move outwardly through the large openings between the spokes 20 and 21.

In order to enhance the air scooping action of the outer spoke elements 20, the structure shown in Figure 3 may be employed wherein a cover 15' in all essential respects the same as the cover 15 has outer spoke elements 20' provided with respective scoop flared lips 30 provided at the side edges of the spokes 20' that move forwardly in the forward rotation of the wheel. Thereby the spokes 20' act in the manner of louvers or impeller vanes to scoop in and drive air inwardly through the cover toward the wheel openings 12.

It may also be noted that by virtue of the substantial uniformly disposed circumferentially directed openings through the cover, dirt and gravel can escape freely from behind the cover.

When it is desired to remove the cover from the wheel, a pry-off tool such as a screw driver or the like may be inserted behind the outer reinforced marginal flange 18 and manipulated to forcibly eject the cover from the wheel. During this action, the reinforced marginal flange 18 as well as the rib flange 17 will reinforce the cover against permanent distortion. Furthermore, although by reason of the slitting of the intermediate portion of the cover at 19 weakening thereof might be expected, the cooperation of the radially spaced reinforcing flange structures 17 and 18 and the mutually cooperative oppositely bowed rib elements 20 and 21 work together to resist permanent distortion although, of course, the spokes may yield resiliently in response to the pry-off pressure.

Where it is desired to increase the scoop-like air moving action of the spokes, not only the outer but also the inner spokes, the construction shown in Figures 4, 5 and 6 may be used. In this construction the various elements are in essential respects the same as in Figures 1 and 2 and therefore idential reference numerals are used in identifying like parts of the tire rim 10 and the wheel body 11, and the like parts of the cover are identified by the same reference numerals double primed to distinguish the modified cover. The principal difference in the cover 15" resides in the fact that the outer spoke elements 20" and the inner spoke elements 21" are tilted in a common direction so as to provide the outer spoke elements 20" with flared lips 31 and the inner spoke elements 21 with flared lips 32 directed in the same circumferential direction for scooping air.

I find that the flaring of the spoke elements 20" and 21" can be readily effected by uniformly skewing the same in response to relatively circumferentially displacing the radially outer reinforcing annular flange portion 18" of the cover and the inner reinforcing rib flange portion 17" of the cover. Since the spoke elements 20" and 21" are in the form of generally radially extending separate bands of material of generally sinuous form longitudinally thereof, such relative moving or displacement of the portions of the cover to which the spoke elements are connected at their inner and outer ends causes the spoke elements to be not only skewed or twisted in transverse direction but also in circumferential direction as seen in Figures 4 and 5. This manner of skewing or tilting the spoke elements into air motivating vanes has the virtue that all of the vanes, being of uniform width and length, are uniformly tilted not only in the same direction but to the same extent. This arrangement assures an attractive ornamental appearance for the cover 15" in addition to improving the efficiency of the air scoops in their air pick-up and impelling ability. Not only the outer spoke elements 20" but also the inner spoke elements 21" serve to impel the air through the cover in the rotation of the wheel.

The direction of the air flowing transversely through the spoked area of the cover 15" will depend upon the direction in which the flaring edges 31 and 32 of the air scoops face with reference to the rotation of the wheel. In other words, these scoops, depending upon which direction their edges face, can be employed to assist in impelling the air in either direction through the spoked area.

In the modification of Figures 7 and 8, a cover 35 is applied to the outer side of a vehicle wheel wherein a wheel body 37 has a series of circumferentially opening inner circulation apertures 38 disposed radially inwardly adjacent to an axially inwardly directed attachment flange 39 by which the wheel body is secured to a base flange 40 of a tire rim 41 of the multi-flanged drop center type. The wheel openings 38 are provided by alternately inwardly and outwardly bowed spoke-like portions of the wheel body separated by generally radially extending slits 44. In the rotation of the wheel air may circulate efficiently through the openings 38.

The cover 35 is preferably made as a drawn or stamped one-piece sheet metal member made from stainless steel or brass or the like and appropriately finished on the outer surface thereof as by polishing and plating. In the cover plate a central crown portion 45 slopes generally radially outwardly and axially inwardly toward juncture with a generally radially and axially outwardly extending outer annular tire rim covering portion 47 of the cover having its outer terminal edge turned under to provide a reinforcing and finishing bead 48 adapted to lie in assembly adjacent to the terminal extremity of the tire rim. Both the side of the crown portion 45 and the outer annular portion 47 of the cover are substantially rigid and are connected together by a series of alternately inwardly and outwardly bowed spoke-like portions 49 and 50, respectively, generally complementary to and adapted to internest with the spoke-like portions 42 and 43 of the wheel body. The spoke-like portions 49 and 50 are severed along generally radial lines and thereby afford openings through the cover complementary to and registering with the openings 38 in the wheel body for air circulation through the cover and the wheel.

In the present instance the spoke elements 49 of the cover are utilized for snap-on pry-off retaining engagement with the wheel. This is accomplished by having the radially inner portions of the spoke elements 49 provided with generally radially inwardly projecting rounded retaining shoulders 51 which are engageable in the resilient interengagement within respective generally radially outwardly opening grooves 52 in the radially inner portions of the wheel body spoke elements 42 defined at the axially outer sides of the grooves 52 by generally axially inwardly and radially outwardly facing retaining shoulders 53.

It will be observed that the major portions of the cover spoke elements 49 extend radially outwardly beyond the retaining shoulder humps 51 and thus afford resilient thrust legs acting toward the retaining humps 51 for pressing the latter into the retaining grooves 52. The radially outer ends of the long legs of the spoke elements 49 are, of course, connected integrally in one piece with the substantially rigid radially outer portion of the cover which backs up the resilient spoke legs.

In applying the cover to the wheel, the cover is generally centered with respect to the wheel and the retaining shoulder humps 51 of the cover are snapped resiliently over and past the retaining shoulders 53 of the wheel by resilient radially outward deflectional yielding of the spoke elements 49 until the retaining hump portions 51 snap into the grooves 52.

Reinforcement for the slit and spoked portion of the cover 35 is afforded by stiffening the spoke elements 50 as by providing the same with longitudinal edge flanges 54 turned generally axially inwardly at the opposite sides of the spoke elements 50 and arranged to overlap the adjacent side edges of the wheel spoke elements 43. In addition, of course, the flanges 54 serve to provide a neat finished appearance at the outer sides of the spoke elements 43 of the wheel.

In the form of the invention shown in Figure 9 a cover 55 is constructed for disposition at the outer side of a vehicle wheel comprising a wheel body 57 having air circulation openings 58 radially inwardly adjacent to an axially inwardly directed attachment flange 59 suitably secured to a base flange 60 of a tire rim 61. The wheel openings 58 are formed by striking out material from the wheel body 57.

The cover 55 may be made as a one-piece sheet metal member formed from stainless steel, sheet brass or the like and appropriately surface finished as by polishing and plating. The cover comprises a crown portion 62 of substantially rigid structure connected to an outer marginal substantially rigidly annular flange portion 63 having an underturned reinforcing and finishing bead 64 adapted to lie adjacent to the terminal tip of the tire rim 61 in assembly. The means for connecting the crown portion 62 to the outer marginal flange portion 63 comprises outwardly bowed or humped rib-like portions 65 and inwardly humped rib-like portions 67 separated by generally radial slitting of the intermediate portion of the cover. Thereby substantial circumferentially directed air openings 68 are provided in the intermediate portion of the cover between the spoke-like portions 65 and 67. By preference the spoke-like portions 65 are substantially rigid as effected by longitudinal side edge generally axially inwardly directed reinforcing and finishing flanges 69.

On the other hand, the inner spoke members 67 are substantially resilient in a generally radial direction and have long leg portions thereof extending from the rigid outer annular marginal portion of the cover to generally radially inwardly humped retaining shoulders 70 engageable in snap-on pry-off relation with cover retaining shoulder flange lips 71 at the radially inner sides of the wheel openings 58. The lip flanges 71 are turned generally axially and radially inwardly so as to provide generally axially inwardly and radially outwardly facing shoulders engageable with the shoulder hump portions 70 of the spokes 67. In applying the covers 55 to the outer side of the wheel it is generally centered with respect to the wheel and the retaining humps 70 resiliently snapped behind the shoulder flanges 71 by resilient radially outward deflection thereof from a normally smaller diameter than the diameter described by the outer faces of the shoulder lips 71, with deflection of the flexible spoke elements 67 accommodating the flexing of the shoulder humps. After the shoulder humps 70 have snapped behind the shoulder portions 71 of the cover, the resilient legs of the spoke elements 67 thrust generally radially inwardly toward the retaining shoulder humps 70.

In Fig. 10, a cover 75 is applied to the outer side of a vehicle wheel comprising a wheel body 77 provided with wheel openings 78 adjacent to an axially inwardly directed attachment flange 79 secured in suitable manner to a base flange 80 of a tire rim 81. The wheel openings 78 are provided by alternately outwardly and inwardly humped spoke-like portions 82 and 83, respectively, of the wheel body 77, severed from one another along slits 84. Thereby the wheel openings 78 face circumferentially and afford large aggregate air circulation flow area through the wheel.

The cover 75 comprises a central crown portion 85 adapted to overlie the wheel body 77 and a radially outer annular generally axially and radially outwardly directed portion 87 for overlying the tire rim and having an underturned outer extremity edge bead 88 adapted to lie in assembly adjacent to the terminal tip of the tire rim. The cover is adapted to be made from suitable gauge sheet metal such as stainless steel or brass or the like and appropriately finished externally as by polishing and plating.

Connection of the convergingly related cover portions 85 and 87 is by means of respective outwardly bowed and inwardly bowed spoke-like elements 89 and 90 generally complementary to the spoke elements 82 and 83, respectively, of the wheel body and overlying the same concealingly in assembly. The cover spoke elements 89 and 90 are severed along radial severance lines 91 so that air openings are provided through the cover complementary to and registering with the openings 78 through the wheel. It will be observed that the spoke elements 89 and 90 are of substantial radial extent and they are resiliently deflectable in response to radial deflectional forces thereagainst. For attaching the cover to the wheel in snap-on pry-off relation, the cover 75 is provided at the inner extremity of the outer annular cover portion 87 at juncture with the resilient spoke elements 89 and 90 with a generally radially outwardly and axially inwardly extending annular underturned, fold-like resilient wheel engaging rib 92 which is engageable in snap-on pry-off relation with an appropriate series of retaining bumps 93 pressed to extend generally axially outwardly and radially inwardly from the juncture of the base flange 80 of the tire rim with a generally radially and axially outwardly directed side flange 94 of the tire rim. It will be observed that the inner faces of the retaining bumps 93 are spaced appropriately from the adjacent portion of the wheel body so as to accommodate the retaining rib 92 of the cover therebetween.

In applying the cover 75 to the outer side of the wheel, the cover is generally centered with respect to the wheel and the retaining rib 92 is then resiliently flexed over the retaining bumps 93. In such engagement flexure, the spoke elements 89 and 90 are resiliently deflectable, but as soon as the retaining rib 92 snaps behind the bumps 93 the spoke elements 89 and 90 afford radially outward resilient thrust assisting the retaining rib in its resilient retaining engagement behind the bumps 93. To pry the cover from the wheel a pry-off tool is applied behind the outer reinforced edge 88 thereof and pry-off force exerted to resiliently snap the retaining rib 92 from the retaining bumps 93.

It will be observed that in all of the forms of the invention in Figures 7 through 10, any tendency toward turning of the cover on the wheel in service is effectively prevented. This comes about by the seating of the inwardly directed spoke-like elements in the depressed or notched out or apertured portions of the wheel spider.

In all forms of the cover disclosed the resilient spokes or vanes which emanate from a continuous annular rigid portion of the cover resiliently yieldably resist by the resilient tension of the spokes or vanes release of the retaining means on the cover engageable with the wheel. In fact, the elongated spoke or vanes apply resilient pressure longitudinally thereof toward the retaining means. While the retaining means is thus quite efficient in retaining the cover against unintentional displacement, the cover can in each instance be removed from the wheel by intentional application of pry-off force therebehind to release the retaining means from the wheel.

It will be understood that modifications and variations may be effected without departing from the scope of the novel concepts of the present invention.

I claim as my invention:

1. In a wheel cover, a circular sheet disk member having an annular part provided with spaced generally radially extended slits, alternate portions separated at their edges by said slits being inset generally axially inwardly relative to the other portions which are directed generally outwardly so that their sides are positioned to scoop up air upon rotation of the cover, and generally radially extending resiliently biased cover retaining means at the ends of substantial generally radially extending lengths of said inset portions arranged in a common circle and deflectable radially from a wheel surface for tensioned engagement therewith under radial thrust toward the wheel surface by said lengths of said inset portions.

2. A one-piece wheel cover, comprising a circular member having an annular part between the periphery and the center of the cover member provided with portions separated on generally radial lines and alternately offset but connected together at their radially outer and inner extremities, said portions being alternately formed into cover-retaining means on the axially inner side of the cover member.

3. In a wheel structure for a wheel including a body part carrying a flanged tire rim having at least one flange provided with an annular groove therein, a one-piece wheel cover comprising a circular member for extending over the junction of said rim and body part and having an annular part between the periphery and center of the cover member provided with portions separated along radial lines and alternately offset in opposite directions but connected together at their radially outer and inner extremities, said portions being alternately formed into cover-retaining means on the axially inner side of the cover member for engaging in the groove of the tire rim flange.

4. In a wheel structure for a wheel including a body part carrying a flanged tire rim having at least one flange provided with an annular groove therein, a one-piece wheel cover comprising a circular member for extending over the junction of said rim and body part and having an annular part between the periphery and center of the cover member provided with portions separated along radial lines and alternately offset in opposite directions but connected together at their radially outer and inner extremities, said portions being alternately formed into cover-retaining means on the axially inner side of the cover member for engaging in the groove of the tire rim flange, said cover member at the radially inner extremities of said portions being formed with a shoulder for bottoming against said body part when the cover is on the wheel.

5. In a wheel structure for a wheel including a body part carrying a flanged tire rim having at least one flange provided with an annular groove therein, a dished wheel cover comprising a circular member for extending over the junction of said wheel rim and body member and having an annular part between peripheral and center portions of the cover member provided with spaced generally radial spoke-like portions connected together at their inner extremities over said body part and having their outer portions inwardly of said peripheral portion provided with resilient cover retaining means on the axially rearward side of the cover member for engaging in the groove of the tire rim flange and being resiliently backed up by said spoke-like portions.

6. In a wheel structure, a cover for disposition at the outer side of the wheel and including a cover body having a series of generally radially extending elongated longitudinally resilient spoke-like elements, and wheel engaging retaining means on the cover radially deflectably engageable with a cooperating portion of the wheel and toward which retaining means said spoke-like elements thrust resiliently to enhance the cover retaining engagement of said means with the wheel.

7. In a wheel structure, a cover for disposition at the outer side of the wheel and including a cover body having a series of generally radially extending elongated longitudinally resilient spoke-like elements, and wheel engaging retaining means on the cover radially deflectably engageable with a cooperating portion of the wheel and toward which retaining means said spoke-like elements thrust resiliently to enhance the cover retaining engagement of said means with the wheel, said cover retaining means comprising radially outwardly directed hump shoulders in the radially outer portion of the spoke-like elements.

8. In a wheel structure, a cover for disposition at the outer side of the wheel and including a cover body having a series of generally radially extending elongated longitudinally resilient spoke-like elements, and wheel engaging retaining means on the cover radially deflectably engageable with a cooperating portion of the wheel and toward which retaining means said spoke-like elements thrust resiliently to enhance the cover retaining engagement of said means with the wheel, said retaining means comprising cover retaining humped shoulders in the radially inner portions of said spoke-like elements.

9. In a wheel structure, a cover for disposition at the outer side of the wheel and including a cover body having a series of generally radially extending elongated longitudinally resilient spoke-like elements, and wheel engaging retaining means on the cover radially deflectably engageable with a cooperating portion of the wheel and toward which retaining means said spoke-like elements thrust resiliently to enhance the cover retaining engagement of said means with the wheel, the cover having a substantially rigid annular structure backing up the extremities of said spoke-like elements remote from said retaining means.

10. A one-piece wheel cover, comprising a circular member having an annular part between the periphery and the center of the cover members provided with portions separated on generally radial lines and alternately offset but connected together at their radially outer and inner extremities, said portions being alternately formed into cover-retaining means on the axially inner side of the cover members, said alternately opposite portions defining air circulation openings therebetween, and certain of said portions being tilted to provide louver lips for enhancing movement of air through said openings.

11. In a wheel structure including tire rim and body parts with air circulation openings adjacent juncture of said parts, a cover for disposition at the outer side of the wheel including a circular member for overlying both of said parts and having an annular portion between the outer peripheral and central portions of the cover provided with generally radially extending portions separated on generally radial lines and alternately offset but connected together at their radially outer and inner extremities, said portions being alternately formed into cover-retaining means on the axially inner side of the cover member for cover retaining engagement with one of said wheel parts and affording openings therebetween for circulation of air through the cover by way of said openings between the separated portions and said wheel openings.

12. For disposition at the outer side of a vehicle wheel having shoulder means thereon, a member formed from sheet material having radially inner and outer annularly solid portions connected by series of alternating axially outwardly and axially inwardly directed spoke-like integral portions, the axially inner of said spoke-like portions having shoulders thereon engageable with the shoulder means on the wheel.

13. In a cover for disposition at the outer side of a vehicle wheel having an annular generally axially inwardly facing cover-retaining shoulder, a member having a substantial series of generally axially inwardly directed spoke-like portions alternating with axially outer spoke-like portions, said axially inwardly directed spoke-like portions having generally radially extending and axially outwardly facing shoulders thereon and with the shouldered portions of said axially inner spoke-like portions being of substantially greater width than the opposite ends of said axially inner spoke-like portions to afford substantial surface at said shoulders for engagement with the shoulder on the wheel.

14. In a cover for disposition at the outer side of a vehicle wheel having an annular generally axially inwardly facing cover-retaining shoulder, a member having a substantial series of generally axially inwardly directed spoke-like portions alternating with axially outer spoke-like portions, said axially inwardly directed spoke-like portions having generally radially extending and axially outwardly facing shoulders thereon and with the shouldered portions of said axially inner spoke-like portions being of substantially greater width than the opposite ends of said axially inner spoke-like portions to afford substantial surface at said shoulders for engagement with the shoulder on the wheel, the shoulders of said spoke-like portions being transversely arcuate for enhanced resilient stiffness.

15. In a vehicle wheel structure having air circulation openings therethrough, a cover for attached disposition at the outer side of the wheel including a member made from sheet material and having radially inner and outer divergently related portions, one of said portions having alternating series of respectively axially outwardly and radially inwardly directed and axially inwardly and radially outwardly directed spoke-like integral portions affording substantial air circulation openings therebetween for communication of air therethrough and the wheel openings.

References Cited in the file of this patent

UNITED STATES PATENTS

| | | |
|---|---|---|
| D. 170,952 | Sinclair | Nov. 24, 1953 |
| 1,386,405 | Hills | Aug. 2, 1921 |
| 2,143,950 | Kliesrath | Jan. 17, 1939 |
| 2,161,904 | Sinclair | June 13, 1939 |
| 2,368,228 | Lyon | Jan. 30, 1945 |
| 2,433,854 | Lyon | Jan. 6, 1948 |
| 2,544,701 | Lyon | Mar. 13, 1951 |
| 2,689,770 | Pipes | Sept. 21, 1954 |

FOREIGN PATENTS

| | | |
|---|---|---|
| 518,572 | France | Jan. 6, 1921 |
| 689,432 | France | May 27, 1930 |